(12) United States Patent
Maty et al.

(10) Patent No.: US 6,797,445 B2
(45) Date of Patent: Sep. 28, 2004

(54) IMAGING MEMBER

(75) Inventors: David J. Maty, Ontario, NY (US);
John A. Bergfjord, Sr., Macedon, NY (US); Stephan V. Drappel, Toronto (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/320,827

(22) Filed: Dec. 16, 2002

(65) Prior Publication Data

US 2004/0115543 A1 Jun. 17, 2004

(51) Int. Cl.$^7$ ............................................. G03G 5/147
(52) U.S. Cl. ..................... 430/58.8; 430/66; 430/65; 430/60; 430/132; 430/59.4; 399/159
(58) Field of Search .................. 430/58.65, 58.75, 430/66, 132, 58.8, 59.6, 60, 65; 399/159

(56) References Cited

U.S. PATENT DOCUMENTS

| | | | |
|---|---|---|---|
| 4,233,384 A | 11/1980 | Turner et al. .................. | 430/59 |
| 4,265,990 A | 5/1981 | Stolka et al. .................. | 430/59 |
| 4,286,033 A | 8/1981 | Neyhart et al. ................ | 430/58 |
| 4,291,110 A | 9/1981 | Lee .............................. | 430/59 |
| 4,299,897 A | 11/1981 | Stolka et al. .................. | 430/59 |
| 4,306,008 A | 12/1981 | Pai et al. ...................... | 430/59 |
| 4,338,387 A | 7/1982 | Hewitt .......................... | 430/58 |
| 4,346,158 A | 8/1982 | Pai et al. ...................... | 430/59 |
| 4,439,507 A | 3/1984 | Pan et al. ..................... | 430/59 |
| 4,485,387 A | 11/1984 | Drumheller .................. | 346/140 |
| 4,654,284 A | 3/1987 | Yu et al. ........................ | 430/59 |
| 4,942,105 A | 7/1990 | Yu ............................... | 430/59 |
| 4,988,597 A | 1/1991 | Spiewak et al. .............. | 430/62 |
| 5,244,762 A | 9/1993 | Spiewak et al. .............. | 430/64 |
| 5,473,064 A | * 12/1995 | Mayo et al. .................. | 540/141 |
| 5,582,949 A | * 12/1996 | Bigelow et al. .............. | 430/132 |
| 5,613,173 A | 3/1997 | Kunzmann et al. ........... | 399/89 |
| 5,721,032 A | * 2/1998 | Parker et al. .................. | 428/57 |
| 6,197,461 B1 | * 3/2001 | Foltz et al. .................... | 430/56 |
| 6,214,514 B1 | 4/2001 | Evans et al. .................. | 430/133 |
| 6,261,729 B1 | * 7/2001 | Yuh et al. ...................... | 430/65 |

OTHER PUBLICATIONS

IBM Technical Disclosure Bulletin, vol. 19, No. 1, p. 287 (Jun. 1976).*
Borsenberger, Paul M. et al. Organic Photoreceptors for Imaging Systems. New York: Marcel–Dekker, Inc. (1993) pp. 6–17, 190–195, 289–292, 338–345, & 349–355.*

* cited by examiner

Primary Examiner—Christopher Rodee
(74) Attorney, Agent, or Firm—Eugene O. Palazzo; Fay, Sharpe, Fagan, Minnich & McKee LLP

(57) ABSTRACT

A flexible electrophotographic imaging member comprising a supporting substrate, at least one imaging layer on one side of the supporting substrate, a charge blocking layer, an optional adhesive layer, a charge-generating layer, a charge transporting layer, a seam overcoat layer comprising a coating solution of a co-polyester resin and having a thickness of from about 2 to about 4 micrometers and having a width of from about 2 to about 10 millimeters and wherein said co-polyester resin is present in an amount of from about 2 to about 40 percent by weight based on the total weight of said overcoat layer, and a binder. The imaging member exhibits an excellent life cycle; excellent wear resistance, excellent electrical performance, and outstanding print quality.

25 Claims, 1 Drawing Sheet

IMAGING MEMBER

BACKGROUND

This invention relates in general to an ultrasonically welded imaging member seam having an overcoat layer comprised of a polyester resin. Advantages associated with the imaging member of the present invention, in embodiments, thereof include for example, decreasing the delamination of the imaging member seam, resulting in an increase in the useful life of the seam especially on long term cycling of the member. Processes of imaging, especially xerographic imaging and printing, including digital, are also encompassed by the present invention. More specifically, the layered photoconductive imaging members of the present invention can be selected for a number of different known imaging and printing processes including, for example, electrophotographic imaging processes, especially xerographic imaging and printing processes wherein charged latent images are rendered visible with toner compositions of an appropriate charge polarity. Moreover, the imaging members of this invention are useful in color xerographic applications

REFERENCES

In the art of electrophotography, an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles, for example, from a developer composition, on the surface of the photoconductive insulating layer. The resulting visible toner image can be transferred to a suitable receiving member such as paper.

Electrophotographic imaging members are usually multilayered photoreceptors that comprise a substrate support, an electrically conductive layer, an optional charge blocking layer, an optional adhesive layer, a charge generating layer, a charge transport layer, and a protective or overcoating layer(s). The imaging members can take several forms, including flexible belts, rigid drums, and the like. The flexible belt may be seamless or seamed. These belts are usually formed by cutting a rectangular sheet from a web, overlapping opposite ends, and welding the overlapped ends together to form a welded seam.

For many multilayered flexible photoreceptor belts, an overcoat layer is usually employed on the backside of the substrate support, opposite to the side carrying the electrically active layers.

Various combinations of materials for charge generating layers and charge transport layers have been disclosed. U.S. Pat. No. 4,265,990 discloses a layered photoreceptor having a separate charge generating (photogenerating) layer and charge transport layer. The charge generating layer is capable of photogenerating holes and injecting the photogenerated holes into the charge transport layer. The photogenerating layer utilized in multilayered photoreceptors include, for example, inorganic photoconductive particles or organic photoconductive particles dispersed in a film forming polymeric binder. Inorganic or organic photoconductive materials may be formed as a continuous, homogeneous photogenerating layer. The disclosure of this patent is incorporated herein in its entirety by reference.

Examples of electrophotographic members having at least two electrically operative layers including a charge generating layer and a charge transport layer are disclosed in U.S. Pat. Nos. 4,265,990, 4,233,384, 4,306,008, 4,299,897 and 4,439,507. The disclosures of these patents are incorporated herein by reference in their entirety.

Delamination of the imaging member seam can cause problems in high speed automatic copiers; duplicators and printers which require extended cycling of the photoreceptor belt. For example, delamination has occurred in as few as 8,000 cycles. Overcoat layers will also occasionally delaminate due to poor adhesion to the supporting substrate. Delamination of belt seams has been found to be a primary reason for the failure mechanism of the belt before the end of the manufacturer's proscribed lifecycle. An overcoat layer may be used to extend the life of the imaging member. It has been demonstrated that seam life can be improved by overcoating the imaging member belt seam with a protective coating.

The overcoat layer may be applied, for example, as a hot melt adhesive, spray coated, brush painted onto the seam, or the overcoat may be applied with a direct writing applicator device, for example, a "micro-pen" which is self-contained, completely integrated synchronous positive displacement pump or pumping system for producing precision deposited images of any fluid material or fluidizable material. Micropens are available commercially from Micropen Incorporated, a subsidiary of OhmCraft Incorporated, of Honeoye Falls, N.Y. Reference also for example, www.ohmcraft.com for additional description of the apparatus and other applications and capabilities. A further description of a direct writing applicator may be found in U.S. Pat. No. 4,485,387 to Drumheller, the disclosure of which is incorporated herein in its entirety by reference. Direct writing technology has been used in other areas to fabricate high precision printed circuit boards and other microelectronic devices comprising resistors, capacitors, interconnecting conductors, and the like devices. The feature sizes of such devices are very precise with respect to line width and line thickness. The direct writing apparatuses that are used to fabricate such devices are essentially high precision dispensing instruments that are capable of dispensing a wide range of liquids and pastes to form the above mentioned microelectronic devices.

What is still desired is an improved belt seam overcoat and application method that further extends the lifecycle of the belt, particularly for modified multilayered electrostatographic imaging members in a flexible belt configuration, and processes for fabricating these imaging members.

SUMMARY

Disclosed herein is an electrophotographic imaging member comprising a supporting substrate, and

- at least one imaging layer on one side of the supporting substrate,
- a charge blocking layer,
- an optional adhesive layer,
- a charge-generating layer,
- a charge transporting layer,
- a seam overcoat layer opposite said at least one imaging layer comprising a coating solution of a polyester resin and having a thickness of from about 2 to about 4 micrometers, and a width of from about 2 to about 10 millimeters and wherein said polyester resin is present in an amount of from about 2 to about 40 percent by weight based on the total weight of said seam overcoat layer, and a binder.

A top seam splash and a lower seam splash are also shown.

Figure 1:
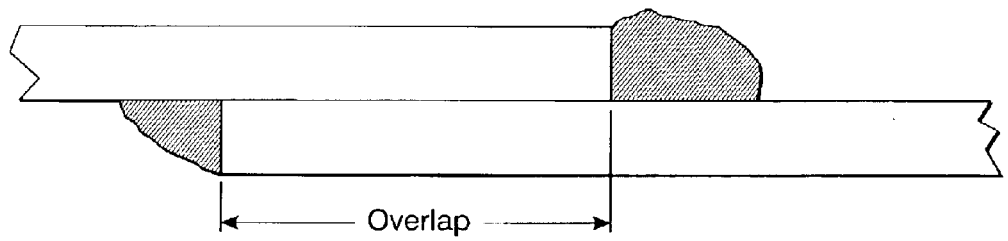
FIG. 1 illustrates an exemplary embodiment of a photoreceptor seam formed between a first belt portion and a second belt portion of a belt.
Figure 2:
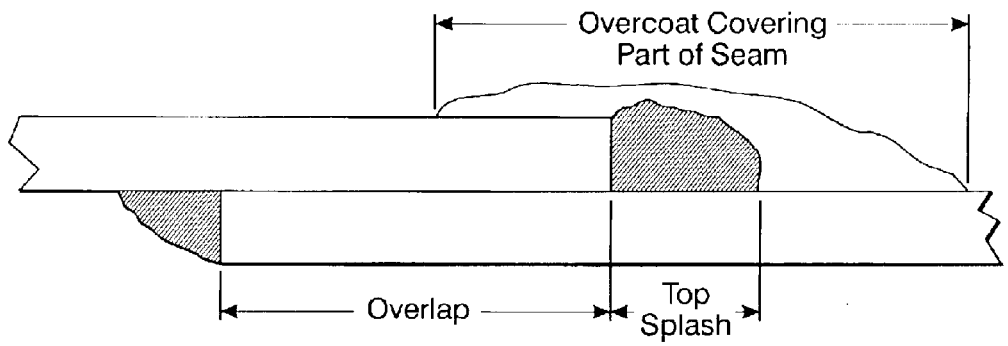

FIG. 2 illustrates an exemplary embodiment of an imaging member photoreceptor belt containing an overcoat layer which covers a part of the seam.

Figure 3:
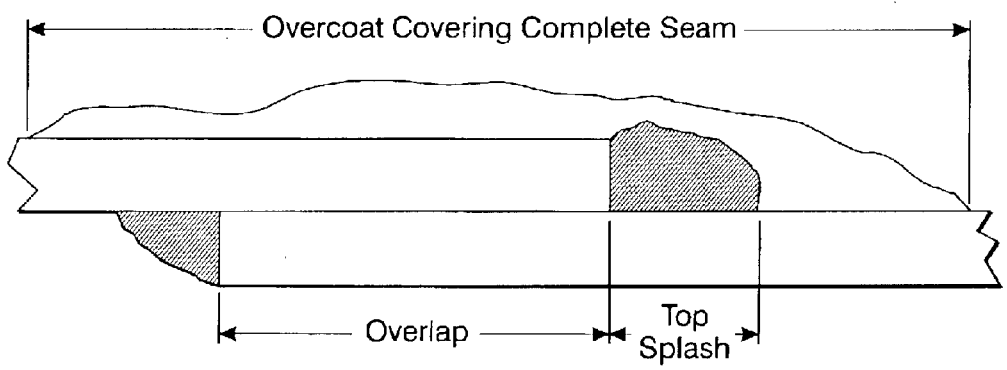

FIG. 3 illustrates an exemplary embodiment of an imaging member photoreceptor belt having an overcoat layer which covers the complete seam.

The overcoat layer of a photoreceptor is, in embodiments, capable of improving the cycle life of a photoreceptor belt. The overcoat layer may include a polyester resin having a high tensile strength of for example, from about 6,000 to about 28,000 pounds per square inch and a glass transition temperature (Tg) of for example, from about 85 to about 90 degrees Celsius. In specific embodiments, a polyester overcoat layer having a thickness of for example, from about 2 to about 4 microns and having for example, a width of from about 2 to about 10 millimeters and available from Bostik Corporation as S1300-30®, S1300-34®, and Vitel 1912® is represented by:

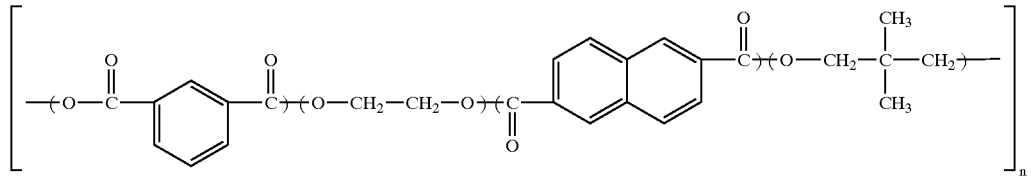

where n represents the number of repeating segments.

In a more specific embodiment, the overcoat layer has a thickness of from about 1 to about 2 micrometers. The polyester resins chosen are amorphous and linear saturated polyester resins. The overcoat layer is formed from a coating solution comprised of methylene chloride, cyclohexanone, and solids.

Any suitable multilayer seamed photoreceptor may be employed in the imaging member of this invention. The charge generating layer, charge transport layer, and other layers may be applied in any suitable order to produce either positive or negative charging photoreceptors. For example, the charge generating layer may be applied prior to the charge transport layer, as illustrated in U.S. Pat. No. 4,265,990, or the charge transport layer may be applied prior to the charge generating layer, as illustrated in U.S. Pat. No. 4,346,158, the entire disclosures of these patents being incorporated in their entirety herein by reference. In embodiments, however, the overcoat layer is employed upon the opposite side of the supporting substrate.

The photoreceptor substrate may be opaque or substantially transparent, and may comprise any suitable organic or inorganic material having the requisite mechanical properties. The substrate can be formulated entirely of an electrically conductive material, or it can be an insulating material including inorganic or organic polymeric materials, such as MYLAR® a commercially available polymer, titanium coated MYLAR®, a layer of an organic or inorganic material having a semiconductive surface layer, such as, indium tin oxide, aluminum, titanium, and the like, or exclusively be made up of a conductive material such as, aluminum, chromium, nickel, brass, and the like. The substrate may be flexible, seamless or rigid and may have a number of many different configurations, such as, for example, a plate, a drum, a scroll, an endless flexible belt, and the like. In one embodiment, the substrate is in the form of an ultrasonically welded multiple seam flexible belt. The back of the substrate, particularly when the substrate is a flexible organic polymeric material, may optionally be coated with a conventional anticurl layer having an electrically conductive surface. In embodiments, the seam overcoat layer has a thickness of from about 2 to about 4 micrometers and comprises a polyester resin having a tensile strength of from about 6,000 to about 28,000 pounds per square inch. The overcoat layer may be applied by several methods, for example, the overcoat may be applied as a hot melt adhesive, a spray coating, by brush application, or by applying with a micro-pen. In specific embodiments, the polyesters are selected from S 1300-30®, S1300-34®, or type 1912® adhesives available from Bostik Corporation, and represented by:

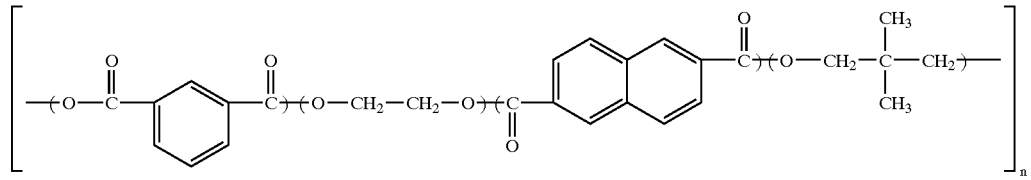

where n represents the number of repeating segments.

The thickness of the substrate layer depends on numerous factors, including mechanical performance and economic considerations. The thickness of this layer may range from about 25 micrometers to about 1,000 micrometers, and in embodiments, from about 50 micrometers to about 500 micrometers for optimum flexibility and minimum induced surface bending stress when cycled around small diameter rollers, for example, 19 millimeter diameter rollers. The surface of the substrate layer is in embodiments, cleaned prior to coating to promote greater adhesion of the deposited coating composition. Cleaning may be effected by, for example, exposing the surface of the substrate layer to plasma discharge, ion bombardment, and the like methods. Similarly, the substrate can be either rigid or flexible. The entire substrate can comprise the same material as that in the electrically conductive surface or the electrically conductive surface can be merely a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, nickel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like.

The conductive layer of the substrate can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness of the conductive layer typically is from about 20 Angstroms to about 750 Angstroms, and in embodiments, from about 100 to about 200 Angstroms for an optimum combination of electrical conductivity, flexibility, and light transmission. A hole blocking layer may then optionally be applied to the substrate. Generally, electron blocking layers for positively charged photoreceptors allow the photogenerated holes in the charge generating layer at the surface of the photoreceptor to migrate toward the charge (hole) transport layer below and reach the bottom conductive layer during the electrophotographic imaging processes. Thus, an electron blocking layer is normally not expected to block holes in positively charged photoreceptors such as photoreceptors coated with a charge generating layer over a charge (hole) transport layer. For negatively charged photoreceptors, any suitable hole blocking layer capable of forming an electronic barrier to holes between the adjacent photoconductive layer and the underlying zirconium or titanium layer may be utilized. A hole blocking layer may comprise any suitable material. The charge blocking layer may include polymers such as polyvinylbutyral, epoxy resins, polyesters, polysiloxanes, polyamides, polyurethanes, and the like, or may be nitrogen containing siloxanes or nitrogen containing titanium compounds such as, trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonate oxyacetate, titanium 4-aminobenzoate isostearate oxyacetate, $[H_2N(CH_2)_4]CH_3Si(OCH_3)_2$, gamma-aminobutyl) methyl diethoxysilane, and $[H_2N(CH_2)_3]CH_3Si(OCH_3)_2$, (gamma-aminopropyl)-methyl diethoxysilane, as disclosed in U.S. Pat. Nos. 4,338,387, 4,286,033 and 4,291,110. Other suitable charge blocking layer polymer compositions are also described in U.S. Pat. No. 5,244,762. These include vinyl hydroxyl ester and vinyl hydroxy amide polymers wherein the hydroxyl groups have been partially modified to benzoate and acetate esters that modified polymers are then blended with other unmodified vinyl hydroxy ester and amide unmodified polymers. An example of such a blend is a 30 mole percent benzoate ester of poly (2-hydroxyethyl methacrylate) blended with the parent polymer poly (2-hydroxyethyl methacrylate). Still other suitable charge blocking layer polymer compositions are described in U.S. Pat. No. 4,988,597. An example of such an alkyl acrylamidoglycolate alkyl ether containing polymer is the copolymer poly(methyl acrylamidoglycolate methyl ether-co-2-hydroxyethyl methacrylate). The disclosures of the U.S. patents are incorporated herein by reference in their entirety.

The blocking layer in embodiments, may be continuous and may have a thickness of less than about 10 micrometers. In embodiments, a blocking layer of from about 0.005 micrometers to about 1.5 micrometers facilitates charge neutralization after the exposure step and excellent electrical performance is achieved. The blocking layer may be applied by any suitable conventional technique such as, spraying, dip coating, draw bar coating, gravure coating, silk screening, air knife coating, reverse roll coating, vacuum deposition, chemical treatment, and the like. For convenience in obtaining thin layers, the blocking layer is, in embodiments, applied in the form of a dilute solution, with the solvent being removed after deposition of the coating by conventional techniques such as by vacuum, heating, and the like. Generally, a weight ratio of blocking layer material and solvent of from about 0.05:100 to about 5:100 is satisfactory for spray coating.

If desired an optional adhesive layer may be formed on the substrate. Any suitable solvent may be used to form an adhesive layer coating solution. Typical solvents include tetrahydrofuran, toluene, hexane, cyclohexane, cyclohexanone, methylene chloride, 1,1,2-trichloroethane, monochlorobenzene, and the like, and mixtures thereof. Typical adhesives include for example, polyesters, polyurethanes, polyacrylates, and the like, and mixtures thereof. Any suitable technique may be utilized to apply the adhesive layer coating. Typical coating techniques include extrusion coating, gravure coating, spray coating, wire wound bar coating, and the like. The adhesive layer is applied directly to the charge blocking layer. Thus, the adhesive layer is in embodiments, in direct contiguous contact with both the underlying charge blocking layer and the overlying charge generating layer to enhance adhesion bonding and to effect ground plane hole injection suppression. Drying of the deposited coating may be effected by any suitable conventional process such as oven drying, infrared radiation drying, air drying, and the like. More specifically the adhesive layer has a thickness of from about 0.01 micrometers to about 2 micrometers after drying. In embodiments, the dried thickness is from about 0.03 micrometers to about 1 micrometer.

The components of the photogenerating layer comprise photogenerating particles for example, of Type V hydroxygallium phthalocyanine, x-polymorph metal free phthalocyanine, or chlorogallium phthalocyanine photogenerating pigments and other known pigments. Type V hydroxygallium phthalocyanine is well known and has X-ray powder diffraction (XRPD) peaks at, for example, Bragg angles (2 theta +/−0.2°) of 7.4, 9.8, 12.4, 16.2, 17.6, 18.4, 21.9, 23.9, 25.0, 28.1, with the highest peak at 7.4 degrees. The X-ray powder diffraction traces (XRPDs) were generated on a Philips X-Ray Powder Diffractometer Model 1710 using X-radiation of CuK-alpha wavelength (0.1542 nanometer). The Diffractometer was equipped with a graphite monochrometer and pulse-height discrimination system. Two-theta is the Bragg angle commonly referred to in x-ray crystallographic measurements. I (counts) represents the intensity of the diffraction as a function of Bragg angle as measured with a proportional counter. Type V hydroxygallium phthalocyanine may be prepared by hydrolyzing a gallium phthalocyanine precursor including dissolving the hydroxygallium phthalocyanine in a strong acid and then reprecipitating the resulting dissolved precursor in a basic aqueous media; removing any ionic species formed by washing with water; concentrating the resulting aqueous slurry comprising water and hydroxygallium phthalocyanine as a wet cake; removing water from the wet cake by drying; and subjecting the resulting dry pigment to mixing with a second solvent to form the Type V hydroxygallium phthalocyanine. These pigment particles in embodiments, have an average particle size of less than about 5 micrometers.

The thickness of the photogenerating layer is for example, from about 0.05 micrometers to about 100 micrometers and in embodiments, from about 0.05 micrometers to about 40 micrometers. The photogenerating binder layer containing photoconductive compositions and/or pigments, and the resinous binder material in embodiments, ranges in thickness of from about 0.1 micrometers to about 5 micrometers, and more specifically is of a thickness of from about 0.3 micrometers to about 3 micrometers for example, to permit excellent light absorption, improved dark decay stability, and excellent mechanical properties.

When the photogenerating material is present in a binder material, the photogenerating composition or pigment may be present in the film forming polymer binder compositions in any suitable or desired amounts. For example, from about 10 percent by volume to about 60 percent by volume of the photogenerating pigment may be dispersed in from about 40 percent by volume to about 90 percent by volume of the film forming polymer binder composition, and in embodiments, from about 20 percent by volume to about 30 percent by volume of the photogenerating pigment may be dispersed in about 70 percent by volume to about 80 percent by volume of the film forming polymer binder composition. Typically, the photoconductive material is present in the photogenerating layer in an amount of from about 5 to about 80 percent by weight, and in embodiments, from about 25 to about 75 percent by weight, and the binder is present in an amount of from about 20 to about 95 percent by weight, and in embodiments, from about 25 to about 75 percent by weight, although the relative amounts can be outside these ranges. The photogenerating layer containing photoconductive compositions and the resinous binder material generally ranges in thickness from about 0.05 micrometers to about 100 micrometers or more, and in embodiments, from about 0.1 micrometers to about 5 micrometers, and in more specific embodiments having a thickness of from about 0.3 micrometers to about 3 micrometers, although the thickness may be outside these ranges. The photogenerating layer thickness is related to the relative amounts of photogenerating compound and binder, with the photogenerating material often being present in amounts of from about 5 to about 100 percent by weight. Higher binder content compositions generally require thicker layers for photogeneration. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, the specific photogenerating compound selected, the thicknesses of the other layers, and whether a flexible photoconductive imaging member is desired. The photogenerating layer can be applied to underlying layers by any desired or suitable method. Any suitable technique may be utilized to mix and thereafter apply the photogenerating layer coating mixture. Typical application techniques include spraying, dip coating, roll coating, wire wound rod coating, and the like. Drying of the deposited coating may be effected by any suitable technique, such as oven drying, infrared radiation drying, air drying, and the like.

Any suitable film forming binder may be utilized in the photoconductive insulating layer. Examples of suitable binders for the photoconductive materials include thermoplastic and thermosetting resins such as polycarbonates, polyesters, including polyethylene terephthalate, polyurethanes, polystyrenes, polybutadienes, polysulfones, polyarylethers, polyarylsulfones, polyethersulfones, polycarbonates, polyethylenes, polypropylenes, polymethylpentenes, polyphenylene sulfides, polyvinyl acetates, polyvinylbutyrals, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchlorides, polyvinyl alcohols, poly-N-vinylpyrrolidinone)s, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazoles, and the like. These polymers may be block, random or alternating copolymers.

Specific electrically inactive binders include poly(4,4'-isopropylidene diphenyl) carbonate, poly(4,4'-diphenyl-1,1'-cyclohexane carbonate) polycarbonate; poly(4,4'-diphenyl-1,1'-cyclohexane carbonate-500, with a weight average molecular weight of 51,000; or poly(4,4'-diphenyl-1,1'-cyclohexane carbonate-400, with a weight average molecular weight of 40,000.

The charge transport layer not only serves to transport holes or electrons, but also protects the photoconductive layer from abrasion or chemical attack. The charge transport layer is normally transparent in a wavelength region in which the electrophotographic imaging member is to be used when exposure is effected therethrough to ensure that most of the incident radiation is utilized by the underlying charge generating layer. The charge transport layer should exhibit negligible charge generation, and discharge if any, when exposed to a wavelength of light of from about 4,000 to about 9,000 Angstroms. When used with a transparent substrate, imagewise exposure or erase may be accomplished through the substrate with all light passing through the substrate. In this case, the charge transport material need not transmit light in the wavelength region of use if the charge generating layer is sandwiched between the substrate and the charge transport layer. The charge transport layer in conjunction with the charge generating layer is an insulator to the extent that an electrostatic charge placed on the charge transport layer is not conducted in the absence of illumination. The charge transport layer should trap minimal charges either holes, for a negatively charged system or electrons, for a positively charged system. Charge transport layer materials are well known in the art.

The charge transport layer may, for example, comprise activating compounds or charge transport molecules dispersed in an electrically inactive film forming polymeric materials for making these materials electrically active. These charge transport molecules may be added to polymeric materials which are incapable of supporting the injection of photogenerated holes and incapable of allowing the transport of these holes.

Various suitable charge transport components may be selected, including known charge, especially hole transporting compounds and molecules, examples of which are, arylamine charge hole transporter molecules represented by:

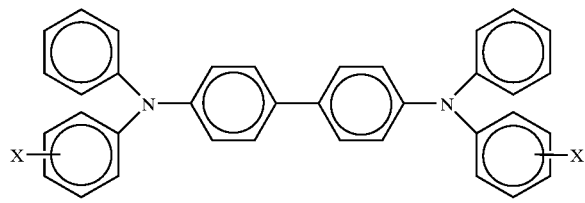

wherein X is selected from the group consisting of alkyl and halogen. Typically, the halogen is a chloride. The alkyl typically contains from 1 to about 10 carbon atoms, and in embodiments, from 1 to about 5 carbon atoms. Typical aryl amines include, for example, N,N'-diphenyl-N,N'-bis (alkylphenyl)-1,1-biphenyl-4,4'-diamine wherein alkyl is selected from the group consisting of methyl, ethyl, propyl, butyl, hexyl, and the like; and N,N'-diphenyl-N,N'-bis (halophenyl)-1,1'-biphenyl-4,4'-diamine wherein the halo substituent is preferably a chloro substituent. Other specific examples of aryl amines include, 9-9-bis(2-cyanoethyl)-2, 7-bis(phenyl-m-tolylamino)fluorene, tritolylamine, N, N'-bis(3,4 dimethylphenyl)-N"(1-biphenyl) amine, 2-bis ((4'-methylphenyl) amino-p-phenyl) 1,1-diphenyl ethylene, 1-bisphenyl-diphenylamino-1-propene, and the like.

An overcoat layer and/or a protective layer can also be utilized to improve resistance of the photoreceptor to abrasion. In embodiments, an anticurl back coating may be applied to the surface of the substrate opposite to that bearing the photoconductive layer to provide flatness and/or abrasion resistance when a web configuration photoreceptor is fabricated. In embodiments, the overcoat layer may comprise for example, a film forming binder in an amount of from about 3 to about 30 percent by weight, based on the total weight of said overcoat layer, of a polyester resin reaction product comprising terephthalic acid, isophthalic acid, ethylene glycol and 2,2-dimethyl-1-propane diol. Overcoat layers are continuous and typically have a thickness of less than about 10 micrometers, although the thickness can be outside this range. In one embodiment the overcoat layer has a thickness of from about 1 to about 10 micrometers. An overcoat can have a thickness of about 3 micrometers for insulating matrices and about 6 micrometers for semi-conductive matrices. The overcoat layer in embodiments, may be applied as a hot melt adhesive or the overcoat layer may be applied with a micro-pen.

The thickness of an optional anticurl backing layer is generally sufficient to balance substantially the total forces of the layer or layers on the opposite side of the substrate layer. An example of an anticurl backing layer is described in U.S. Pat. Nos. 4,654,284, 4,942,105, 6,214,514, the disclosures of each are totally incorporated herein by reference.

The imaging members of the present invention can be utilized in an electrophotographic imaging process, by for example, first uniformly electrostatically charging the photoreceptor, then exposing the charged photoreceptor to a pattern of activating electromagnetic radiation such as light, which selectively dissipates the charge in the illuminated areas of the photoreceptor while leaving behind an electrostatic latent image in the non-illuminated areas. This electrostatic latent image may then be developed at one or more developing stations to form a visible image by depositing finely divided electroscopic toner particles, for example, from a developer composition, on the surface of the photoreceptor. The resulting visible toner image can be transferred to a suitable receiving member such as paper. The photoreceptor is then typically cleaned at a cleaning station prior to being re-charged for formation of subsequent images.

EXAMPLE I

A photoreceptor was fabricated into a photoreceptor belt using an ultrasonic welding process. The area adjacent to the seam overlap of the photoreceptor belt at both the top and bottom of the seam contains a substrate having a thickness of about 90 micrometers comprised of titanium coated MYLAR®, a charge generation layer having a thickness of about 20 micrometers and comprised of hydroxygallium phthalocyanine in an amount of about 35 weight percent based on the total weight of the charge generation layer, and about 65 weight percent of MAKROLON® a polycarbonate resin having a weight average molecular weight of from about 50,000 to about 120,000. This area adjacent to the seam overlap further includes a charge transport layer having a thickness of about 30 micrometers and comprised of N,N'-diphenyl-N,N'-bis(alkylphenyl)-1,1-biphenyl-4,4'-diamine in an amount of about 35 weight percent and poly(4,4'-diphenyl-1,1'-cyclohexane carbonate) in an amount of about 65 weight percent, and a third layer referred to as a splash. The splash extends from 0.5 to 2.0 millimeters away from the seam overlap and is at a height above the plane of the surrounding photoreceptor belt device. The edge of the splash farthest away from the overlap contacts the charge transport layer. It is at this charge transport layer contact area along the splash where the top layers of the photoreceptor delaminate into the imaging area upon prolonged cycling of an imaging device such as for example, a copier. The delamination can cause deterioration of the belt, resulting in poor print quality and eventually rendering the belt unusable. The seam was coated with an overcoat layer from about 0.1 to about 2 millimeters beyond the bottom splash to about 0.1 to about 2 millimeters beyond the top splash, resulting in an overcoat layer thickness of from about 0.01 to about 1 millimeters of Bostik S1300-30® in methylene chloride. The seam was protected from delamination by the Bostik S1300-30® during cycling of the belt. The overcoat layer was applied as a hot melt adhesive. The overcoat layer was dried at a temperature of 100 degrees Celsius for about 30 minutes depending on the coating thickness.

EXAMPLE II

A photoreceptor belt was prepared following the procedures as described in Example I except, for example, that the overcoat layer was applied with a direct writing applicator device, for example, a "Micro-pen". In addition, the overcoat layer was placed over one half of the overlap area and was extended past the top splash, at a thickness of from about 0.01 to about 1 millimeters of the Bostik 1300-34® polyester resin in methylene chloride, and to about 1 millimeter past the end of the splash. The device was then dried at the same time and temperature conditions as Example 1. The photoreceptor of the present invention may be charged using any conventional, charging apparatus, which may include, for example, an AC bias charging roll (BCR), see, for example, U.S. Pat. No. 5,613,173, incorporated herein by reference in its entirety. Charging may also be effected by other known methods, for example, utilizing a corotron, dicorotron, scorotron, pin charging device, and the like.

Although the invention has been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. An imaging member comprising:

a supporting substrate, imaging layers formed on one side of the supporting substrate comprising, a charge blocking layer, a charge-generating layer, and a charge transport layer, and a seam overcoat layer formed on said imaging layers, the seam overcoat layer generated from a coating solution comprising a polyester resin wherein said seam overcoat layer has a thickness of from about 2 to about 4 micrometers and a width of from about 2 to about 10 millimeters and wherein said polyester resin is represented by:

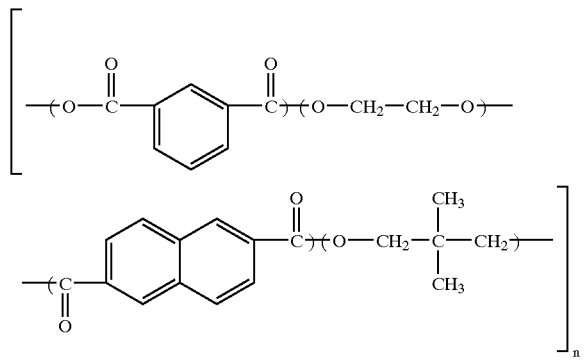

wherein n represents the number of repeating segments.

2. An imaging member according to claim 1 wherein said polyester resin has a glass transition temperature of from about 70 degrees Celsius to about 100 degrees Celsius.

3. An imaging member according to claim 1 wherein said polyester resin has a glass transition temperature of from about 85 degrees Celsius to about 90 degrees Celsius.

4. An imaging member according to claim 1 wherein said seam overcoat layer is formed from a coating solution comprising methylene chloride, cyclohexanone, and solids.

5. An imaging member according to claim 1, wherein said polyester resin has a tensile strength of from about 6,000 to about 28,000 pounds per square inch.

6. An imaging member according to claim 1, wherein said charge transport layer contains a charge transport component comprising an arylamine represented by:

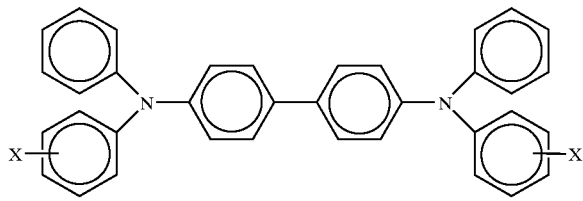

wherein X is selected from the group consisting of alkyl and halogen.

7. An imaging member according to claim 1, wherein said charge transport layer comprises an arylamine selected from the group consisting of, N,N'-diphenyl-N,N'-bis (alkylphenyl)-1,1-biphenyl-4,4'-diamine, N,N'-diphenyl-N, N'-bis(halophenyl)-1,1'-biphenyl-4,4'-diamine, 9-9-bis(2-cyanoethyl)-2,7-bis(phenyl-m-tolylamino)fluorene, tritolylamine, N,N'-bis(3,4 dimethylphenyl)-N"(1-biphenyl) amine, 2-bis ((4'-methylphenyl) amino-p-phenyl) 1,1-diphenyl ethylene, and 1-bisphenyl-diphenylamino-1-propene.

8. An imaging member according to claim 1 wherein said polyester resin has a weight average molecular weight of from about 20,000 and about 100,000.

9. An imaging member according to claim 1 wherein the charge transport layer comprises a charge transport component in an amount of from about 20 to about 80 percent by weight.

10. An imaging member according to claim 1 wherein the charge transport layer comprises a charge transport component in an amount of from about 40 to about 60 percent by weight.

11. An imaging member according to claim 1 further comprising an adhesive layer comprised of polyurethanes or polyesters.

12. An imaging member according to claim 1 wherein said imaging member is in the form of a multiple-seam imaging member belt and wherein said multiple-seam imaging member belt is ultrasonically welded.

13. An imaging member according to claim 12 wherein said multiple-seam imaging member belt includes a seam region comprising an overlap and a top splash and a bottom splash and said overcoat layer is applied to overcoat at least the top splash of said multiple-seam imaging member belt.

14. An imaging member according to claim 13 wherein said overcoat layer is spray coated over the entire area of said seam region.

15. An imaging member according to claim 12 wherein said overcoat layer is applied as a hot melt adhesive over the entire width of said multiple-seam imaging member belt.

16. An imaging member according to claim 1 wherein said substrate has a thickness of from about 50 micrometers to about 1,000 micrometers.

17. An imaging member according to claim 1 wherein said substrate has a thickness of from about 80 to about 120 micrometers.

18. An imaging member according to claim 1 wherein said charge blocking layer comprises zinc oxide, titanium oxide, silica, polyvinyl butyral or phenolic resins.

19. An imaging member according to claim 1 wherein said charge blocking layer has a thickness of from about 2 micrometers to about 4 micrometers.

20. An imaging member according to claim 1 wherein said charge generating layer comprises Type V hydroxygallium phthalocyanine, chlorogallium phthalocyanine, x-polymorph metal-free phthalocyanine, vanadyl phthalocyanine, selenium, selenium alloys, or trigonal selenium photogenerating pigments.

21. An imaging member according to claim 1 wherein said charge generating layer comprises hydroxygallium phthalocyanine and which layer has a thickness of from about 2 to about 5 micrometers.

22. An image forming device comprising a photoreceptor and a charging device which charges the photoreceptor, wherein the photoreceptor comprises
a supporting substrate,
imaging layers formed on one side of the supporting substrate comprising
a charge blocking layer,
a charge-generating layer, and
a charge transporting layer, and
an overlap seam overcoat layer formed on the imaging layers, the overcoat layer formed from a coating solution comprising a polyester resin binder wherein said seam overcoat lever has a thickness of from about 2 to about 4 micrometers and a width of from about 2 to about 10 millimeters and wherein said polyester resin is represented by:

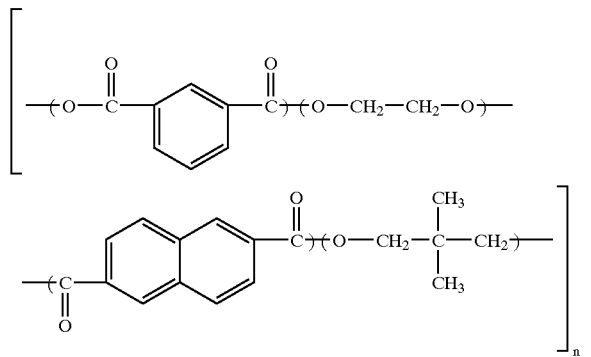

wherein n represents the number of repeating segments.

23. The image forming device according to claim 14 wherein the photoreceptor is in the form of a multiple-seam belt.

24. The image forming device according to claim 22 an wherein said image forming device further comprises a hole blocking layer, and an adhesive layer.

25. An imaging member comprising:
a supporting substrate defining a first side and a second side,
from two to about six imaging layers formed on the first side of the supporting substrate comprising at least,
a charge-generating layer, and
a charge transporting layer, and
a seam overcoat layer formed on the imaging layers, the seam overcoat layer generated from a coating solution comprised of a polyester resin wherein said seam overcoat layer has a thickness of from about 2 to about 4 micrometers and a width of from about 2 to about 10 millimeters and wherein said polyester resin is represented by:

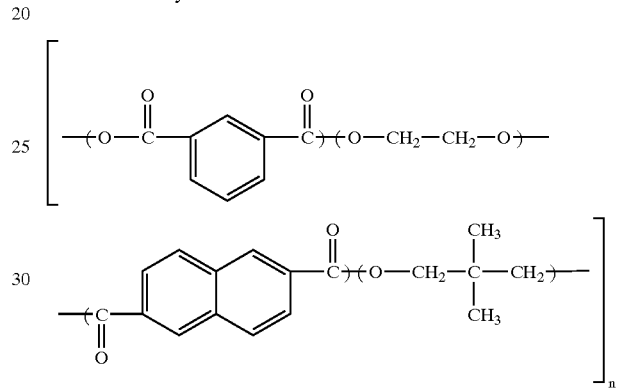

wherein n represents the number of repeating segments.

* * * * *